United States Patent
Nakano

(10) Patent No.: US 7,650,320 B2
(45) Date of Patent: Jan. 19, 2010

(54) METHOD AND SYSTEM FOR EFFICIENT INDEXED STORAGE FOR UNSTRUCTURED CONTENT

(75) Inventor: Russell Toshio Nakano, Sunnyvale, CA (US)

(73) Assignee: Nahava Inc., Sunnyvale, CA (US)

( * ) Notice: Subject to any disclaimer, the term of this patent is extended or adjusted under 35 U.S.C. 154(b) by 424 days.

(21) Appl. No.: 11/361,166

(22) Filed: Feb. 23, 2006

(65) Prior Publication Data

US 2006/0190465 A1    Aug. 24, 2006

Related U.S. Application Data

(60) Provisional application No. 60/656,521, filed on Feb. 24, 2005.

(51) Int. Cl.
*G06N 5/02* (2006.01)
(52) U.S. Cl. .................................... 706/48; 707/101
(58) Field of Classification Search .................. 706/48; 707/101
See application file for complete search history.

(56) References Cited

U.S. PATENT DOCUMENTS

| 6,389,424 B1 | 5/2002 | Kim et al. |
| 6,694,311 B1 | 2/2004 | Smith |
| 6,714,909 B1 | 3/2004 | Gibbon et al. |

OTHER PUBLICATIONS

Hellerstein et al "Generalized Search Trees for Database Systems" 1995.*
Shim, K.; Srikant, R.; Agrawal, R., "High-dimensional similarity joins," Knowledge and Data Engineering, IEEE Transactions on, vol. 14, No. 1, pp. 156-171, Jan./Feb. 2002 URL: http://ieeexplore.ieee.org/iel5/69/21112/00979979.pdf?isnumber=21112=STD&arnumber=979979&arnumber=979979&arSt=156&ared=171&arAuthor=Shim%2C+K.%3B+Srikant%2C+R.%3B+Agrawal%2C+R.

* cited by examiner

*Primary Examiner*—David R Vincent
*Assistant Examiner*—Lut Wong
(74) *Attorney, Agent, or Firm*—Heimlich Law, PC; Alan Heimlich, Esq.

(57) ABSTRACT

A method and apparatus for efficient indexed storage for unstructured content have been disclosed.

6 Claims, 8 Drawing Sheets

METHOD AND SYSTEM FOR EFFICIENT INDEXED STORAGE FOR UNSTRUCTURED CONTENT

RELATED APPLICATION

This patent application claims priority of U.S. Provisional Application Ser. No. 60/656,521 filed Feb. 24, 2005 titled "Method and Apparatus for Efficient Indexed Storage for Unstructured Content", which is hereby incorporated herein by reference.

FIELD OF THE INVENTION

The present invention pertains to storage. More particularly, the present invention relates to a method and apparatus for efficient indexed storage for unstructured content.

BACKGROUND OF THE INVENTION

Unstructured content, for example, multimedia, does not fit well in conventional databases. Conventional databases perform admirably on structured content, but for unstructured content they lack the ability to insert and query via efficient indexes. This presents a problem.

Unstructured content includes, among other things, text, multimedia and cutting-edge data types such as genomic sequences. Text covers documents, emails, blogs, etc. Multimedia encompasses images, music, voice, video, etc. The absence of robust, scalable indexing techniques distinguishes unstructured content from the structured content. While structured content relies heavily on indexes based on hash-table and tree-based techniques to make it possible to rapidly search a repository for items that satisfy given criteria. Unstructured content uniformly lacks the equivalent kind of indexing. This presents a problem.

One stop-gap solution designates certain characteristics of unstructured content as "features." Next, apply conventional indexing techniques on those synthetically generated features. For example, for a repository of digital images, attach features consisting of the time an image was taken, the camera used, who took the picture, the location, and additional descriptive text. Adding "features" takes effort. This presents a problem. First, when the number of items is large it is often impractical to manually apply features, commonly referred to as, "hand-tagging." Second, content might be manually tagged once, but it can be impractical to revisit them to tag them for another reason. For example, one could plausibly imagine tagging a collection of images of faces with the shape of the nose, eyes, or mouth. However, when a new inquiry arises, it may be impractical to rescan the entire collection of images to annotate for a particular mole near the nose or for a scar on the forehead. This presents a problem.

BRIEF DESCRIPTION OF THE DRAWINGS

The invention is illustrated by way of example and not limitation in the figures of the accompanying drawings in which.

DETAILED DESCRIPTION

Figure 1:
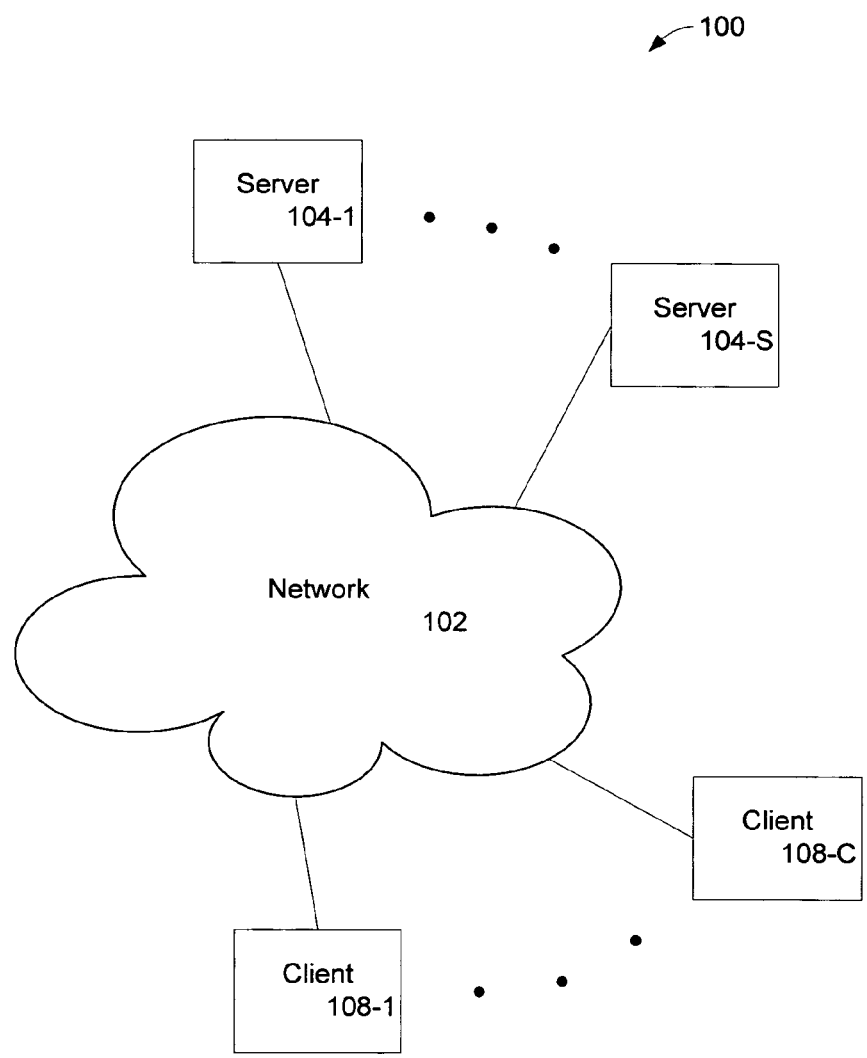
FIG. 1 illustrates a network environment in which the method and apparatus of the invention may be implemented.

The present invention is a method and apparatus for efficient indexed storage for unstructured content. The present invention in one embodiment uses classes of unstructured content data elements as represented by vectors in an inner product space. In one embodiment of the present invention techniques based on the inner product spaces are used to build, maintain, and query indexed storage structures. The techniques disclosed allow, among other things, for unstructured content to benefit from efficient, similarity-based, indexed storage structures.

The present invention in one embodiment illustrates how to efficiently index unstructured content. For example, given a collection of N items x.i, a storage structure is devised so that starting with given a query item x*, one can efficiently obtain the most similar items in the collection. By "efficiently," is meant that both insertion and query time are proportional to log(N). By "most similar," is meant closeness in the sense of a numerical distance, or metric.

The present invention techniques are more easily explained by considering an approach of designing a storage system for indexing a particular kind of unstructured content in two stages: modeling and indexing. In the modeling stage, a scheme that associates unstructured content items to vectors in an abstract inner product space is used. With each unstructured content item represented in this way an efficient indexing scheme is disclosed.

Approaches to indexing data elements rely on the ability to group like elements together. The classic B-tree index structures group keys on fixed sized data "pages" according to some scheme to partition a large space. For example, if one has a collection of employee ids, $\{0, 1, 2, \ldots, 199\}$, a tree that holds no more than 199 keys on a node might use the value id=100 as the basis to "split" these keys into two nodes where each contains $\{0, \ldots, 99\}$ and $\{100, 199\}$, respectively. The present invention in one embodiment discloses a "splitter" to function similar to the id=100 key in the previous example. In one embodiment the splitter value is determined by computing the average of the keys in $\{0, \ldots, 199\}$, which is id.avg=100. Form the deviation from the i-th id, d.i=(id.i−id.avg). Next compute the median of the deviation values d.i. Since by definition the median splits the collection as evenly as possible, assign the elements whose deviations are greater than the median to one node, and the rest to the other node. In one embodiment, as illustrated below, the splitting approach to inner product spaces is disclosed.

For the sake of reference with respect to terms used in this disclosure, Attachment 1 summarizes the properties of vector spaces, metric spaces, and inner product spaces.

A fundamental operation used in the present invention is to partition a collection of vectors into two parts. To illustrate embodiments of the present invention, the discussion will first show that token sequences can be modeled as vectors, together with an inner product function that expresses similarity of the underlying sequences. To illustrate the range of possibilities, it will be shown that text can be viewed as a sequence of tokens that represent words, punctuation, and associated formatting. The second is genomic data, which consists of long sequences of nucleotide codes. Next, it will be shown that image blocks can also be viewed as vectors, together with an inner product that expresses image similarity. Finally, it will be shown that music can be represented as vectors, with an associated inner product that captures similarities related to the genre of music and the artist.

Token Sequences

In one embodiment of the present invention, problems involving token sequences can be handled by expressing the sequences as probabilistic transition matrices which have an inner product. For example, one may have an enumerable set of tokens $\{s.j\}$, and a source that generates a sequence of tokens. The source of the tokens could be words in an email or nucleotide bases encoded in DNA. Based on observing the emitted sequence, one can model the sequence as a stationary probabilistic process. Under this scenario, at a given time, the source has a conditional probability of emitting a given token, which is conditioned on the most recently emitted K tokens. For convenience, refer to K most recent tokens as a tuple $\{r.i\}$. Suppose one has a transition matrix $A=(a.i.j)$, where $a.i.j$ represents the probability of transitioning to token $s.j$ from a tuple $r.i$. The matrix A has the property that for each row i, the quantity $sum(j, a.i.j)=1$. This expresses that given the current system state is tuple i, that it must transition to one of the tokens described by the matrix A.

Matrices and matrix operations of addition, multiplication, combined with multiplying by a scalar, satisfy the properties of a linear vector space. For the inner product, we adopt the following inner product:

$$<A,B>=trace(A.transpose*B)$$

In other words, first arrange for A and B to be conformant, meaning that they agree on the assignment of tuples and tokens to their rows and columns. Next take transpose A and multiply it by B. Finally, the inner product is the trace, of the product, which is the sum of the diagonal elements.

Token Sequence Example #1

Text

Given a block of text, tokenize it by mapping words, word breaks, punctuation, and other formatting into a sequence of tokens. The tokenizer performs the desired mapping from text to tokens. From the above discussion, it follows that a block of text corresponds to a probability transition matrix. In other words, associate a block of text with its corresponding vector in an inner product space. A distance function expressed between two vectors as, $$Distance(A,B)=sqrt(<A-B,A-B>)$$

This distance is also known as the "norm,"

$$Distance(A,B)=\|A-B\|=sqrt(<A-B,A-B>)$$

According to this metric, we say that two text blocks are similar if the distance between their corresponding probability transition matrices is small. In practice, we have found that this numerical measure corroborates our own ordinary concept of "similar" text. For example, when the distance between two text blocks is small, the text is satisfyingly similar to a human reader. Empirically, we have found that using a tuple width that remembers the two most recent words tends to work very well. Often only a small wording change separates the two text blocks.

Figure 3:
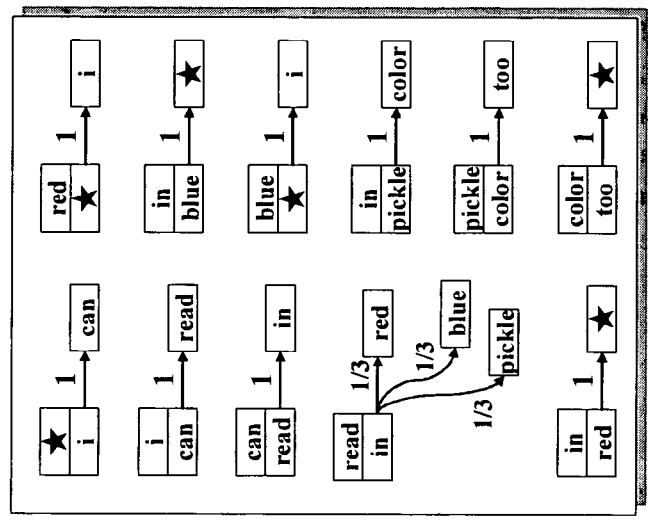
FIG. 3 illustrates text as a sequence of tokens and then represented as a probability transition matrix.
Figure 3:
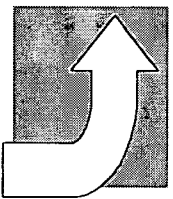

FIG. 3 illustrates one embodiment of the invention, showing how a sequence of tokens is transformed into probabilistic state transitions from a tuple that describes the recently seen tokens in the sequence, to the next token into the sequence. The text shown the Figure is from the Dr. Seuss book titled "I Can Read With My Eyes Shut!"

Token Sequence Example #2

Genomic Data

Another kind of unstructured content is genomic data. Using an embodiment of the present invention, DNA sequences of nucleotides can be parsed and transformed into sparse probabilistic tuple-to-token transition matrices. For example, the VIIth and XIVth chromosomes of Baker's yeast (Saccharomyces cerevisiae) consist of 563,000 and 784,000 bases, respectively. In one embodiment of the invention, a tuple width of 8, 15, and 30 have been used to perform the "splitting" operation. The operations to compute the average and deviation each take 40 seconds to 3 minutes, depending on the tuple width, for each chromosome on a vintage 2002 desktop PC. This confirms that long token sequences associated with raw nucleotide data can be mapped to an inner product vector space.

Image Blocks

The techniques of the present invention may be used on image blocks, as similarity between two images can be represented by computing an inner product over "signatures" derived from FFT-based spectral analysis. For example, the orientation information in the source image may be captured in the angular spectra after an edge-finding filter has been applied to the pixels. Transform image components from the source image using FFT, and retain angular components in the 55-125 degree range. Tabulate the frequency of occurrence of these values of angles in a histogram vector. Define the inner product as the sum of the product of the counts associated with each angle.

Building search index structures for image blocks as disclosed in the present invention has importance that goes beyond people merely wanting to locate images. Rapidly finding the most similar image block is an important sub-problem in image and video compression.

Audio Blocks

The techniques of the present invention may be used on audio blocks, as parameter vectors derived from MFCC transformation on short audio segments can represent similarity between music. For example, a "signature" for each piece of music is obtained by taking overlapping 26 ms segments of sound, analyzing the spectral content of each segment, deriving 40 or fewer parameter values for each segment, and then clustering the segments around the 16 most representative centroids for each cluster. Each piece of music, therefore, may be represented by something on the order of 40*16=640 parameter values. Thus multimedia content such as music can be represented by vectors in an inner product space, and that with the right choice of inner product closeness in the vector space corroborates with human evaluations of similarity in artist and genre.

Splitting Algorithm

In one embodiment of the present invention, the "splitting operation" is used to split a set of vectors. "Algorithm" as used herein and as detailed below is a shorthand way of expressing to those knowledgeable in the art a concrete tangible result.

Given a collection of n vectors x.i, we illustrate one embodiment of the invention showing a procedure to split it into two parts.

1. For ease of discussion, we assume that any duplicates have been removed from the collection x.i. In other words, for any x.i and x.j, where i!=j, we have ||x.i−x.j||!=0. This is a reasonable assumption because the x.i are keys for the underlying unstructured content.
2. Compute the mean x.avg=(1/n)*sum(i, x.i).
3. If x.avg is non-zero, then we split the collection into two halves as follows. Compute the median: for each i, compute the deviation d.i=<x.i−x.avg, x.avg>. We know that the values of the deviations will be positive and negative because we can show that sum(i, d.i)=0.

$$\begin{aligned} \text{sum}(i, d.i) &= \text{sum}(i, <x.i - x.avg, x.avg>) \\ &= \text{sum}(i, <x.i, x.avg>) - \text{sum}(i, <x.avg, x.avg>) \\ &= <\text{sum}(i, x.i), x.avg> - \text{sum}(i, <x.avg, x.avg>) \\ &= <n*x.avg, x.avg> - n*<x.avg, x.avg> \\ &= n*<x.avg, x.avg> - n*<x.avg, x.avg> \\ &= 0 \end{aligned}$$

Furthermore, we know that all the d.i cannot be zero, because that would imply that all the x.i are equal to x.avg, which would imply that all the x.i are equal. And we have specifically constructed this collection to avoid that situation.

4. Otherwise, if x.avg is zero, or if the split is unsatisfactory, then use one of the techniques below (Fallback split or Jitter).

Fallback Split

Take the n distinct content items, and apply a sort criterion that guarantees in the worst case to allow us to achieve a split. For example, in the case of text strings, we apply a string comparison that guarantees to let us sort n distinct strings, and to pick a median string value. All the items that sort above the median value are put into the "upper" subtree, and the rest go into the "lower" subtree.

The following example shows how the fallback split works. Suppose we have the following items.

"contact us"
"more information"
"press releases"
"our investors"

Applying a string comparison leads to the resulting sort.

"contact us"
"our investors"
- - - split goes here - - -
"more information"
"press releases"

The splitter remembers that the fallback technique was used, and hence any string that sorts after "our investors" would go into the "upper" set.

Jitter

In another technique, modify x.avg=(1/n)*sum(i, x.i) to introduce a deliberate "jitter" into the averaging computation:

$$x.pvg = \text{sum}(j, u.j * e.j)$$

where u.j is a random variable distributed in the range [u.min, u.max].

In practice, we have obtained good results when u.j is uniformly distributed over the interval [0.5, 1.5].

The role that this deliberate jitter plays can be elucidated by describing an actual situation where this problem arises. Suppose we are computing text similarity, and the text items within a collection are as follows:

"contact us"
"more information"
"press releases"
"our investors"

We observe that these strings have the same word length, and these text strings share no words in common. We tokenize these text strings by straightforwardly assigning each word to a token and then convert the respective token sequences into a transition matrix representations A.1, . . . , A.4. Use the trace norm as the inner product, $$<A.i, A.j> = \text{trace}(A.i.\text{transpose} * A.j)$$

Because there is no overlap in words, the product of the matrices consists of all only zero elements when we compare different text strings. Hence the trace is zero, and we obtain a zero inner product, <A.i,A.j>=0, when i!=j.

If furthermore the lengths of the strings are identical, then the inner product of each item against itself is the same, <A.i,A.i>=C, for all i.

Before we introduce jitter, the deviation becomes, $$\begin{aligned} d.i &= <A.i - \text{sum}(k; A.k), \text{sum}(j; A.j)> \\ &= <A.i, \text{sum}(k; A.k)> - <\text{sum}(k; A.k), \text{sum}(j; A.j)> \\ &= \text{sum}(k; <A.i, A.k>) - <\text{sum}(k; A.k), \text{sum}(j; A.j)> \\ &= <A.i, A.i> - <\text{sum}(k; A.k), \text{sum}(j; A.j)> \\ &= <A.i, A.i> - <\text{sum}(k; A.k), \text{sum}(j; A.j)> \\ &= \text{constant over all the } i \end{aligned}$$

We see that when the items are mutually orthogonal, the term that normally contributes a different value for each item drops out, and we are left with all the deviations being identical.

The jitter introduced by the random variable u.j avoids this degenerate situation by applying a weighting to the average, $$\begin{aligned} d.i &= <A.i - \text{sum}(k; u.k * A.k), \text{sum}(j; u.j * A.j)> \\ &= \text{sum}(k; u.k * <A.i * A.k>) - \\ &\quad <\text{sum}(k; u.k * A.k), \text{sum}(j; u.j * A.j)> \end{aligned}$$

-continued $$= u.i * \langle A.i, A.i \rangle - \langle \text{sum}(k; u.k * A.k), \text{sum}(j; u.j * A.j) \rangle$$

$$= u.i * C - \langle \text{sum}(k; u.k * A.k), \text{sum}(j; u.j * A.j) \rangle$$

$$= \text{different for each } i$$

We see that the random jitter introduces dispersion in the direction of the average vector, x.avg or x.pvg, which counteracts symmetries in the lengths and directions of the items in the collection Keep in mind that once the splitter has computed the values of the u.j, those values need to be remembered for subsequent use on other vectors that are applied to the splitter. This gives the deterministic property that if two identical vectors were to be subsequently applied to the splitter, because the values u.j are fixed, then if the first one went to the "upper" side, then the second one will do so as well.

Call this chosen vector the pseudo-average, x.pvg. Use it in the formula of the previous step in place of x.avg. In other words, compute the deviations d.i=<x.i–x.pvg, x.pvg>, (this constructs an orthonormal basis for the n vectors x.i) and proceed as before.

5. Obtain the median, which we will call the "split value," by the following procedure:
   a. Initialize D to the collection of values d.i.
   b. While D contains more than two elements, remove the smallest and largest values from the collection D. Repeat this step until one or two elements remain.
   c. After step b. completes, D must consist of either one or two elements. If D contains one element, then that is the median. Call it the split value. Otherwise, if D contains two remaining elements, then the median split value is the average of the deviations corresponding to the two elements.

6. In some pathological situations, when the average sum(i, x.i) is zero, the arbitrary choice of any x.i in the set at step 0 might not yield a good split value that partitions the set adequately. If that occurs, discard the current x.pvg and repeat steps 0-0, until a satisfactory split is obtained. For example, we may want to reject splits that put none on one side, and all the rest on the other. However, for example, we may accept a split that puts Z elements on one side, and Z-1 on the other.

To recap, given a collection of vectors, use the above procedure to compute the mean and the split value. Using the mean, x.avg, and the median, or split value, d.mid, gives us a way to partition the vector space into a "lower" and "upper" half. Together we call the combination of the mean and the split value a "splitter."

We use a splitter as follows: given an arbitrary vector y, a splitter computes the value d=<y–x.avg, x.avg>. If d>0 we assign y to the "upper" group. Otherwise, we assign y to the "lower" group.

Figure 4:
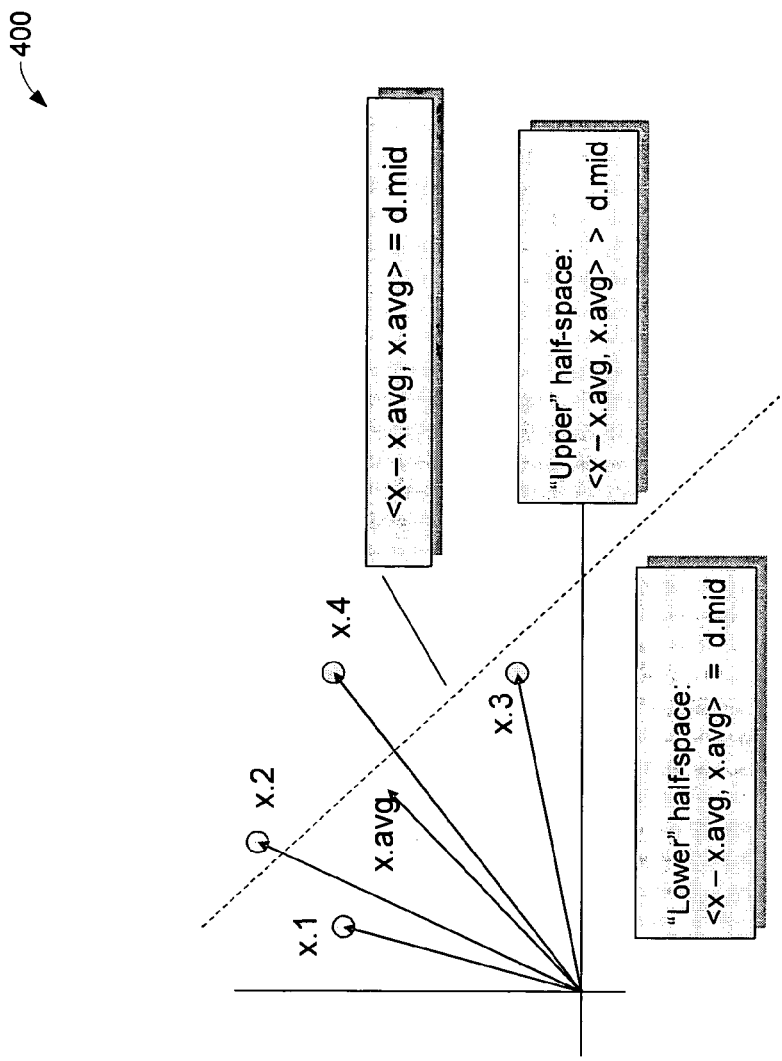
FIG. 4 illustrates one embodiment of the present invention showing a collection of vectors, together with the median of the deviation values defining a hyperplane that splits the vectors into two distinct half-spaces.

Having the ability to construct splitters over a vector space gives us a powerful capability, because each splitter partitions the space into two distinct parts. In the vector space corresponding to the Cartesian plane, an example of a splitter is shown in FIG. 4. FIG. 4 shows how the average of a collection of vectors, together with the median of the deviation values defines a hyperplane that splits the vectors into two distinct half-spaces. The splitter S consists of the mean (x.avg) and the split-value (d.mid).

Figure 6:
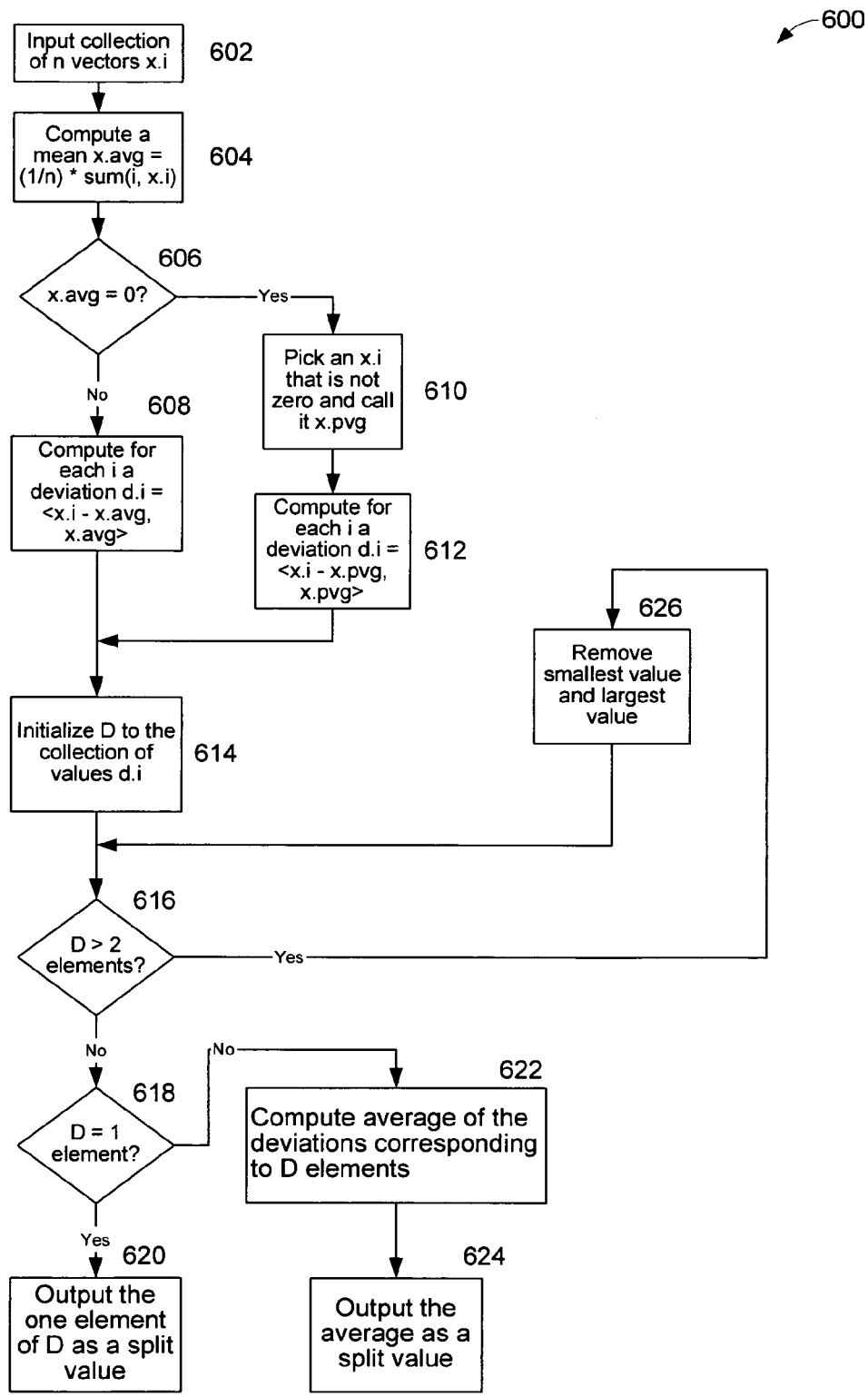
FIG. 6 illustrates one embodiment of the present invention showing a flowchart for a splitting technique.

FIG. 6 illustrates one embodiment of the present invention showing a flowchart for a splitting technique.

Static Binary Index Tree

In one embodiment of the present invention, the "indexing operation" is used to build a static binary tree. "Algorithm" or "function" as used herein and as detailed below is a shorthand way of expressing to those knowledgeable in the art a concrete tangible result.

For sake of illustration, we assume we have a collection T, consisting of N vectors, where N is very large. By "very large" we mean that it is impractical to find the nearest-neighbor of one vector by a brute-force pairwise comparison against the other N-1 vectors. Instead, our approach is to recursively subdivide the collection N into smaller collections of k or fewer vectors, where k<<N.

Build Static Binary Tree

Function: BuildStaticBinaryTree(U)

Input: U is a collection of vectors.

Output: Returns the root-most node of a sub-tree that indexes the vectors in U.

Sketch: Recursively builds a binary tree. An interior node has a splitter and two child nodes. A leaf node contains a collection of k or fewer vectors.

1. If the number of elements in U is k or fewer, then construct a leaf node consisting of the collection U. Return a reference to the leaf node.
2. Otherwise, compute a splitter S for the vectors in U as described previously, which entails computing the mean and the split value.
3. Use splitter S to partition U into the "lower" half (U.lower), and the "upper" half (U.upper).
4. The "lower" child node reference is BuildStaticBinaryTree (U.lower).
5. The "upper" child node reference is BuildStaticBinaryTree (U.upper).
6. Create an interior node that consists of the splitter S, and references to the lower and upper child nodes.
7. Return a reference to the interior node.

Given a static binary tree R and a query vector q, it is possible to find the vectors that are nearest q in the sense of the norm of the vector space. There are two cases to consider. In the first case, we assume that candidate nearest vectors are contained in a small neighborhood around the query q. In the second case, we assume the more general situation that the candidates are at most some finite distance away.

Case 1: Small Neighborhood

In the small neighborhood case, we traverse the tree from the root to the leaf node, deciding at each node whether to go to the upper or lower child, depending on the deviation obtained from the splitter.

To find the nearest vectors to a given query vector q, call SearchSmallNeighborhood(R, q), where R is the root of the binary tree.

Function: SearchSmallNeighborhood(N, q)

1. If N is a leaf node, compute the distance e.i=||q–x.i|| for each vector x.i contained in node N. Return the element with the smallest distance e.i.
2. If N is an interior node, obtain the splitter S from node N and compute the deviation d=<q–S.avg, S.avg>.
3. If d>S.split, return SearchSmallNeighborhood (N.upper, q).
4. Otherwise, return SearchSmallNeighborhood (N.lower, q).

Figure 7:
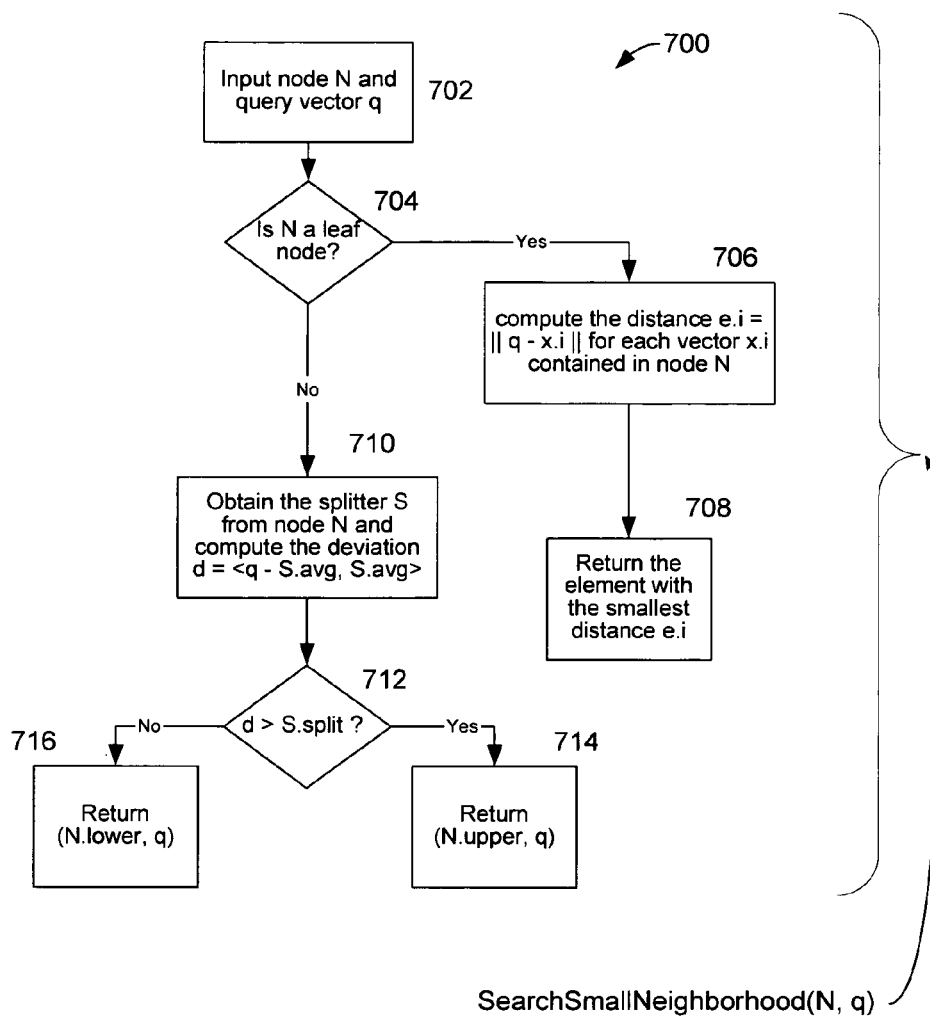
FIG. 7 illustrates one embodiment of the present invention showing a flowchart for a small neighborhood search.

FIG. 7 illustrates one embodiment of the present invention showing a flowchart for a small neighborhood search Case 2: Finite-Size Neighborhood In the finite-size neighborhood case, we want to find all vectors that are closer than some radius h from the query q.

We follow the same basic procedure as before, except that we need to take into account that in some circumstances we need to explore both branches in the tree. This situation arises when the distance from the query vector to the splitting hyperplane associated with a splitter at a particular node is closer than our target radius h. In that case, we must visit both the lower and upper child nodes.

To find the vectors within a distance h of a given query vector q, call SearchFiniteNeighborhood(R, q, h), where R is the root of the binary tree.

SearchFiniteNeighborhood(N, q, h)
1. If N is a leaf node, compute the distance e.i=$\|q-x.i\|$ for each vector x.i contained in node N. Return the elements with the distance e.i<h.
2. Otherwise, we have an interior node. Obtain the splitter S from node N and compute the deviation d=<q−S.avg, S.avg>.
3. Compute the distance from q to the separating hyperplane. The distance from q to the hyperplane is sqrt (|S.split−d|).
4. If h exceeds the distance from q to the hyperplane, then compute both SearchFiniteNeighborhood(N.upper, q, h) and SearchFiniteNeighborhood(N.lower, q, h), and return the union of the results.
5. Else if d>S.split, return the results from SearchFiniteNeighborhood(N.upper, q, h).
6. Otherwise, return the results from SearchFiniteNeighborhood(N.lower, q, h).

Figure 8:
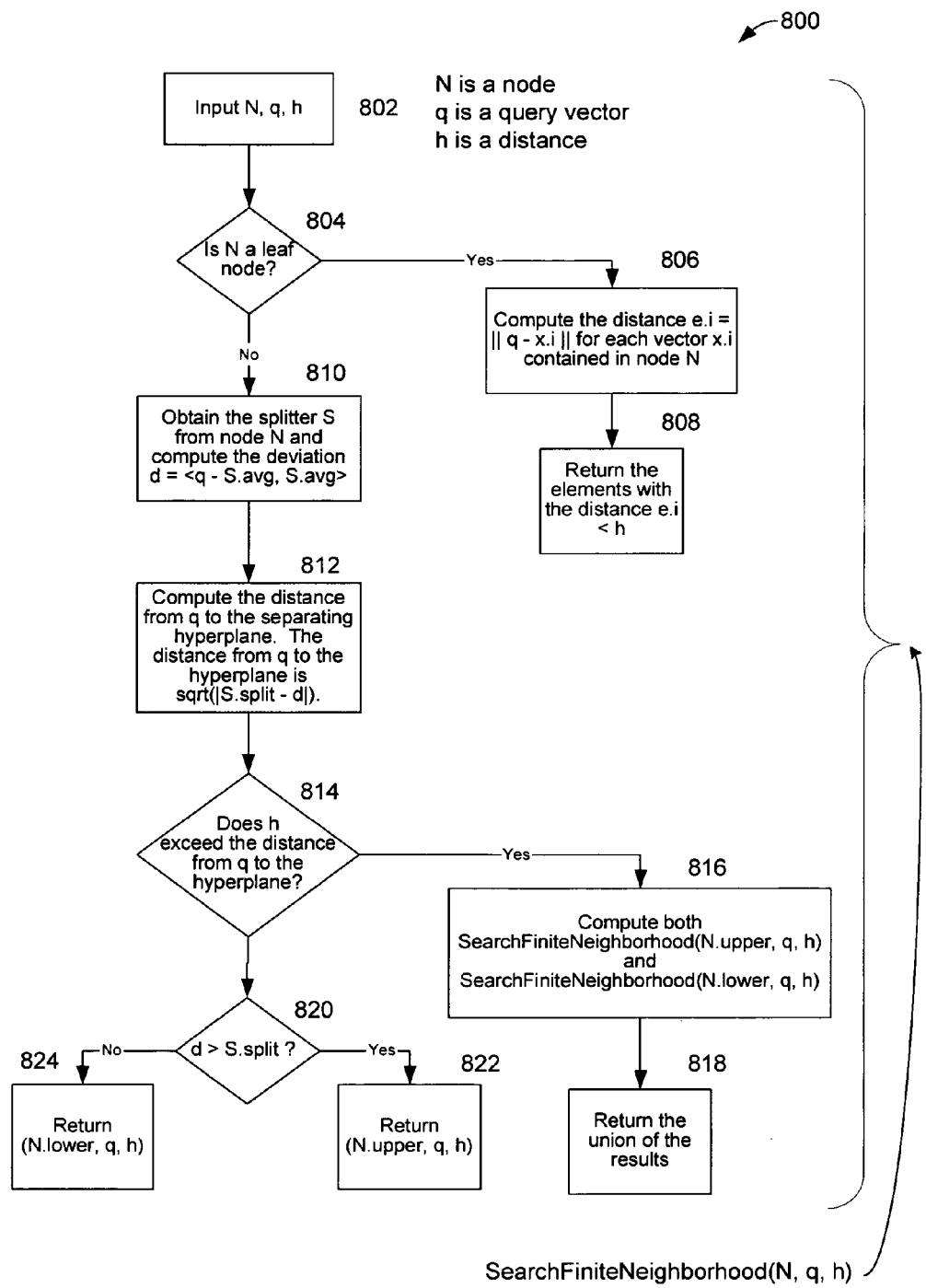
FIG. 8 illustrates one embodiment of the present invention showing a flowchart for searching a finite neighborhood.

FIG. 8 illustrates one embodiment of the present invention showing a flowchart for searching a finite neighborhood.

Note that unlike SearchSmallNeighborhood, which follows precisely one path from the root of the tree to a single leaf node, SearchFiniteNeighborhood follows the paths down both child nodes whenever the query resides sufficiently close to the splitting hyperplane. We see that the "small neighborhood" case is the limiting case when the desired radius is very small. Conversely, when the desired radius is very large, more and more of the tree is explored until, in the limit when the entire tree is searched.

One way to incrementally expand the extent of a search is to do an initial search in the small neighborhood mode. As we traverse the tree, record the distance from the query to the splitting hyperplane. At the conclusion of the search, the smallest distance represents the largest search radius that would conform to the small neighborhood condition. From that point, incrementally traverse the nodes with the smallest gap, and continue to record the hyperplane gaps. By paying particular attention to the smallest gap of the as yet unvisited node at each stage of the expanded search, we can correctly assert the radius around the query in which we have definitively searched. In other words, we can assert that there does not exist any unvisited node that contains a vector closer than the search radius.

The proof of this is as follows. Suppose to the contrary that a vector x* exists on a leaf node, such that $\|q-x^*\|$<h. But that implies that when x* was inserted into the tree, at each node, it had to have been inserted on the opposite child from the path that the search traversal took and that node could not have been one that was visited on the search expansion phase, because that visits both children. But on a one-visited node, we have the following condition, otherwise the insertion path for x* would have been the same for the q's query path:

$$\|q\|+h<\|x^*\|$$

$$\|x^*\|-\|q\|>h$$

But the triangle inequality tells us that $\|q\|+\|x^*-q\|>=\|x^*\|$. In other words, we have:

$$\|x^*-q\|>=\|x^*\|-\|q\|$$

Combining these two expressions, we have shown that $\|x^*-q\|$>h, which contradicts our assumption.

This shows that no such vector x* exists on an unvisited node that is within our search radius h. Therefore, all the nodes that we do visit contain all the candidate nodes that could possibly be within the desired search radius.

The present invention, in various embodiments has introduced how to use a splitter to exploit the properties of an inner product space. The key mechanisms revolve around splitting a node and using a splitter to search a tree. For the sake of clarity of explanation, we deliberately focused our attention on constructing and searching a simple binary tree. In particular, we assumed that all the vectors that would populate the tree are known in advance. This allowed us to build a balanced binary tree, without concern for rebalancing algorithms and the like. However, the invention is not so limited.

In the following sections, we shift our attention to height-balanced trees. Again for the sake of explanation, we illustrate various embodiments of the invention within the framework of existing approaches. To that end, we will illustrate embodiments of the present invention in terms of Generalized Search Trees (GiST). The GiST framework provides for common tree operations that maintain the index structures, including search, iteration, insertion and deletion. See Attachment 2 for a GiST tree framework overview.

A GiST codifies the essential steps in building, maintaining, and searching a height-balanced tree:
1. Search
2. Insert
3. ChooseSubtree
4. Split
5. AdjustKeys
6. Delete
7. CondenseTree For ease of reference, these algorithms are reproduced in Attachment 2. Additionally, since we are focusing on vectors within an inner product space, we omit specific functions from the GiST framework that introduce special support for linearly ordered domains: IsOrdered, Compare, and FindMin.

The framework defines specific "driver" algorithms that adapt a particular GiST for a specific data type as the key:
1. Consistent
2. Union
3. Penalty
4. PickSplit
5. Compress/Decompress Consistent(q)
Input: Given query predicate q.
Output: Return set of subtrees of the current node that could possibly hold elements that satisfy predicate q.
Sketch: Use the approach in SearchSmallNeighborhood or SearchFiniteNeighborhood, described earlier, depending on which mode is implied by the query predicate q.
1. [Leaf node] If the current node is a leaf, then apply the query predicate q to each data element contained in the current node. Return all the data elements that satisfy q.
2. [Interior node] If the current node is an interior node, then start at the topmost splitter; call it the current splitter. (Refer to PickSplit to see when the topmost splitter is introduced, and how it is maintained.)

3. Apply the query predicate to the current splitter, and go the lower or upper child, call the child the current node. If the query is in finite neighborhood mode, and the distance from the query to the splitting hyperplane is less than the search neighborhood, then both child nodes need to be visited until we bottom out at step 0.
4. If the current node is an interior node, then go to step 0.
5. If the current node is a pointer to a subtree, then return the subtree referenced by the pointer.

Union(P)
Input: Set of entries P
Output: Return a predicate r, that holds for all tuples stored below the entries contained in P.
Sketch: Union is called when a node is split. When that occurs, the parent of the node that split must now point both to the newly created node, in addition to the existing child node. The purpose of Union is to update the index structures of the parent to accommodate the newly created node.
1. [Base case] If the existing child is the sole child reference on the current node, then add the splitter that has been created as part of the split operation, to the current node, and replace the child reference with a splitter. On that splitter, set the lower pointer to the existing child, and set the upper pointer to the new child.
2. [Expansion case] Otherwise, the existing child reference originates from an existing splitter on the current node. Add the splitter that has been created as part of the split operation, to the current node. Replace the child reference on the existing splitter with a reference to the newly added splitter. On that splitter, set the lower pointer to the existing child, and set the upper pointer to the new child.

Penalty(E.1, E.2)
Input: Two entries E.1 and E.2.
Output: Return the penalty associated with inserting E.2 into the subtree rooted at E.1.
Sketch: In the GiST framework, the Penalty function is called during ChooseSubtree, which in turn is called during Insert, to help determine the best choice of child node to hold a given data element.
1. Start with the topmost splitter on the current node and apply it to the query predicate.
2. Traverse down the lower or upper branch of the splitter, depending on the deviation and the splitter's split value. Continue until a reference to a reference to a child node entry is reached. This entry gets no penalty, and all other entries receive a high penalty.

PickSplit(P)
Input: Set of M+1 entries P
Output: Return two sets P.1 and P.2 that represent a split of the entries in P.
Sketch: There are two situations to handle. First, if the current node is a leaf node, and second, if the current node is an interior node.
1. [Leaf node] If the current node is a leaf node, then the entries of P will be data element vectors. In this case, use the procedure described earlier to construct a splitter. This entails computing the average of the data vectors, and the median split value.
2. [Interior node] Alternatively, if the current node is an interior node, then the entries of P will be splitters. As described above, one of the splitters will always be the topmost node of a binary tree of splitters within the current node. This root splitter has lower and upper pointers. Each pointer either references another splitter in the current node, or it references a node at the next lower level in the tree. Visit each pointer down to the leaf nodes and count the number of data elements, to determine whether splitting according to the lower and upper pointers will be satisfactory. If yes, then create a new node and move into it all the splitters in the current node that live down path starting from the upper child. For the lower child reference, if the reference is to a splitter on the current node, then that splitter becomes the new topmost splitter. For the upper child reference, if the reference is to a splitter, then that splitter becomes the topmost splitter on the newly created node.

If performing a split according to the topmost splitter is unsatisfactory, other approaches become necessary. Often this occurs when the splitter performs badly on data elements that are inserted into the tree after the splitter was originally constructed. In other words, the splitter may have done a reasonable job partitioning the data elements present in a node at the time that node split. But after that time, subsequent data elements did not divide well using that splitter. In one embodiment of the invention, we use the approach of decommissioning the splitter in question, collecting all data elements down the lower and upper branches, and reinserting those elements at the top of the tree. Note that this may entail decommissioning additional splitters that reside both on the current node and on other nodes at lower levels in the tree.

We handle the reinsert situation in the following way:
1. Given a splitter S.old to be decommissioned, visit the lower and upper branches, all the way to the leaf nodes. Collect the data elements in a "reinsert" queue Q.
2. Construct a new splitter S.new, using the elements of Q.
3. Insert the splitter S.new into the location where S.old would have gone.
4. For the lower child pointer on S.new, build a linked linear chain of interior nodes at level greater than zero, and terminating with an empty leaf node at level 0.
5. Do the same thing for the upper child pointer on S.new.
6. Finally, for each data element in Q, insert it into the tree.

In practice this approach works well. First, it is straightforward to implement, and it is simple to understand. Second, reinsertion events occur somewhat infrequently, triggered when an existing collection of splitters becomes unbalanced. This tends to occur when the collection of data elements on which a splitter is based turn out to not translate into good splitting policy for subsequent insertions. Seeding the reinsertion that follows with a new pre-computed splitter over the reinsertion set works well because the new splitter has been optimized for that set.

Figure 5:
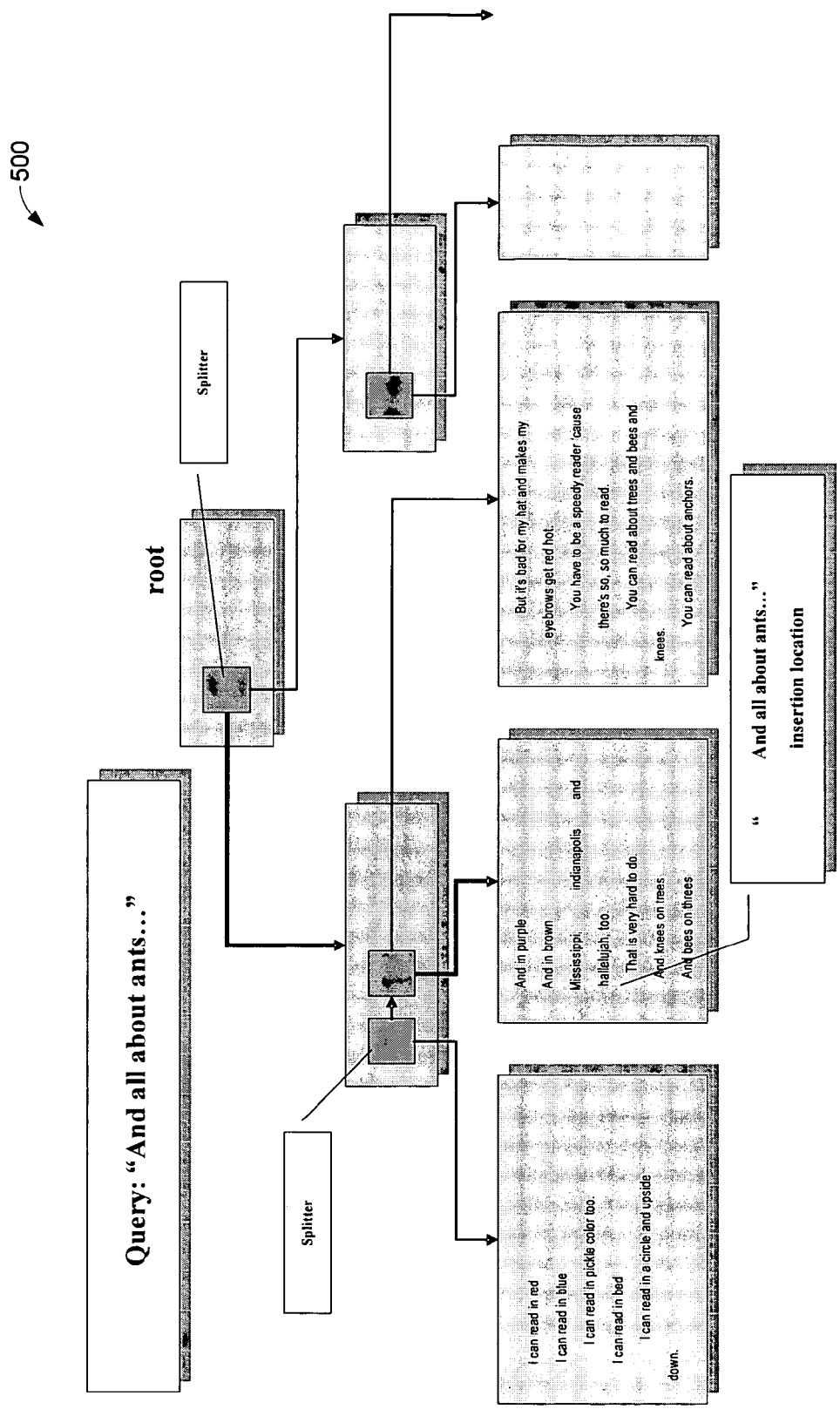
FIG. 5 illustrates one embodiment of the present invention showing a three-level GiST where data elements reside in the leaf nodes and interior nodes contain splitter objects that either point to other splitters within the same node, or point externally to other nodes.

FIG. 5 shows a three-level GiST. The data elements reside in the leaf nodes. The interior nodes contain splitter objects that either point to other splitters within the same node, or point externally to other nodes. The text is from Dr. Seuss.

The present invention as disclosed above in various embodiments, illustrates how unstructured content can be modeled as elements in a vector space, how inner product functions can express the similarity of two data elements, and techniques that endow inner product vector spaces with indexing capabilities.

Thus a method and apparatus for efficient indexed storage for unstructured content have been described.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Figure 2:
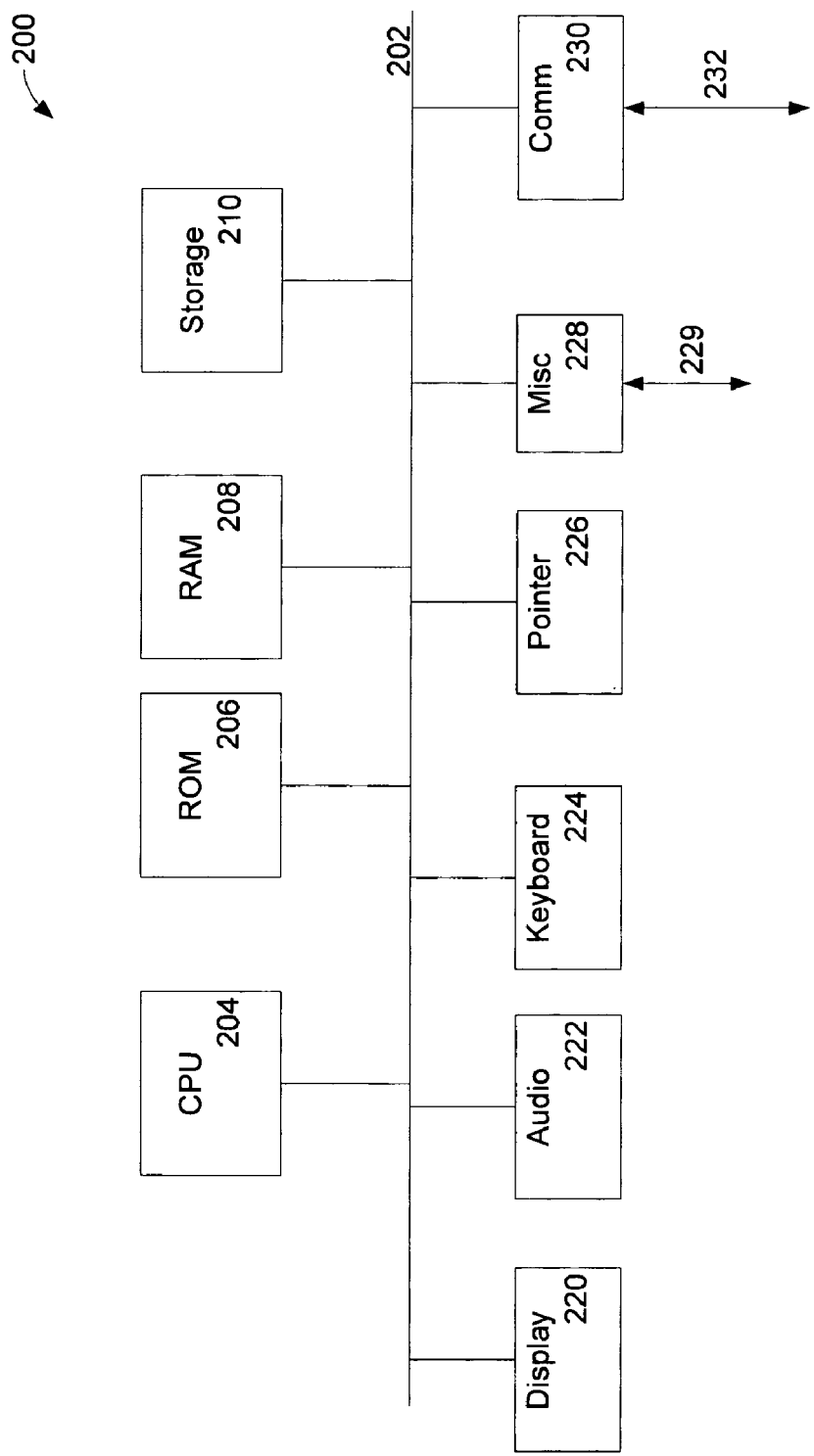
FIG. 2 is a block diagram of a computer system which may be used for implementing some embodiments of the invention.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms (or functions) and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for efficient indexed storage for unstructured content have been described.

Attachment 1: Properties of Various Spaces

Linear Space

The elements in a linear space S have the following properties:

1. (Zero) There is a zero element in S. Call it 0.
2. (Multiplicative closure). For a scalar a, and an element x, a*x is in S.
3. (Additive closure) For elements, x and y in S, x+y is in S.

Metric Space

The elements in a metric space S have the following properties:

There is a function distance d(., .), also called the "norm," $\|.\|$ in a linear space: S×S→R that satisfies the following properties for elements in the space:

1. $0 <= d(x,y) < \infty$, for all x and y.
2. d(x, y)=0 if and only if x=y.
3. d(x, y)=d(y, x) for all x and y.
4. d(x, z)<=d(x, y)+d(y, z) for all x, y, z Inner Product Space There is an inner product function <., .>: S×S→R that satisfies the following properties:

1. (Positive) <x, y>>=0, for all x and y.
2. (Zero) <x, x>=0 if and only if x=0, for all x.
3. (Symmetry) <x, y>=<y, x>, for all x and y.
4. (Linear) <a*x, y>=a*<x, y>, for all scalars a, and x and y.
5. (Triangle) <x, z><=<x,y>+<y, z>, for all x, y, z.

Discussion

A distance function D(x,y) can be derived from the inner product: D(x, y)=sqrt(<x−y, x−y>), which is often written as the norm, $\|x-y\|$. This says that an inner product space is metric space, where we use the norm as the distance function. But the converse may not be true.

The following interesting theorem that pinpoints the difference between a metric space and an inner product space.

Theorem: A normed linear space is an inner product space if and only if the following condition holds:

(Parallelogram Law)

$$\|x+y\|^2 + \|x-y\|^2 = 2(\|x\|^2 + \|y\|^2)$$

The "splitter" introduced in this paper is a hyperplane that divides the entire space into two half-spaces. We choose the location of the hyperplane to partition N data elements into their respective half-spaces. This again illustrates the advantage of an inner product space, because bare metric spaces do not have enough geometry to allow hyperplanes.

Attachment 2: Generalized Search Tree (GiST) Tree Framework Functions

A GiST tree can be understood by examining how it searches and inserts items.

Search(R, q)

Input: GiST rooted at R, predicate q

Output: all tuples that satisfy q

Sketch: Recursively descend all paths in tree whose keys are consistent with q.

S1: [Search subtree] If R is not a leaf, call Consistent on R to obtain set of entries E. Invoke Search on the subtree whose root node is referenced in E.ptr.

S2: [Search leaf node] If R is a leaf, call Consistent on R to determine the entries E on which the predicate q is satisfied. If yes, E is a qualifying entry. At this point, E.ptr could be fetched to check q accurately, or this check could be left to the calling process.

Insert(R, E, I)

Input: GiST rooted at R, entry E=(p, ptr), and level I, where p is a predicate such that p holds for all tuples reachable from ptr.

Output: new GiST resulting from insert of E at level I

Sketch: find where E should go, and add it there, splitting if necessary to make room.

I1: [Invoke ChooseSubtree to find where E should go] Let L=ChooseSubtree(R, E, I)

I2: If there is room for E on L, install E on L. Otherwise invoke Split(R, L, E).

I3: [propagate changes upward] AdjustKeys(R, L).

ChooseSubtree(R, E, I)

Input: subtree rooted at R, entry E=(p, ptr), level I

Output: node at level I best suited to hold entry with characteristic predicate E.p Sketch: Recursively descend tree minimizing Penalty.

CS1: If R is at level I, return R;

CS2: Else among all entries F=(q, ptr') on R find the one such that Penalty(F, E) is minimal. Return ChooseSubtree(F.ptr', E, I).

Split(R, N, E)

Input: GiST R with node N, and a new entry E=(p, ptr).

Output: the GiST with N split in two and E inserted.

Sketch: split keys of N along with E into two groups according to PickSplit. Put one group onto a new node and Insert the new node into the parent of N.

SP1: Invoke PickSplit on the union of the elements of N and {E}, put one of the two partitions on node N, and put the remaining partition on the new node N'.

SP2: [Insert entry for N' in parent] Let E.N'=(q, ptr'), where q is the Union of all entries on N', and ptr' is a pointer to N'. If there is room for E.N' on Parent(N), install E.N' on Parent(N). Otherwise invoke Split(R, Parent(N), E.N')

SP3: Modify the entry F which points to N, so that F.p is the Union of all entries on N.

AdjustKeys(R, N)

Input: GiST rooted at R, tree node N.

Output: the GiST with ancestors of N containing correct and specific keys.

Sketch: ascend parents from N in the tree, making the predicates be accurate characterizations of the subtrees. Stop after root, or when a predicate is found that is already accurate.

AK1: If N is the root, or the entry which points to N has an already-accurate representation of the Union of the entries on N, then return.

AK2: Otherwise, modify the entry E which points to N so that E.p is the Union of all entries on N. Then AdjustKeys(R, Parent(N)).

Delete(R, E)

Input: GiST R, leaf entry E=(p, ptr).

Output: balanced GiST with E removed.

Sketch: Remove E from its leaf node. If this causes underflow, adjust tree accordingly. Update predicates in ancestors to keep them as specific as possible.

D1: [Find node containing entry] Invoke Search(R,E.p) and find leaf node L containing E. Stop if E not found.

D2: [Delete entry] Remove E from L.

D3: [Propagate changes.] Invoke CondenseTree(R, L);

D4: [Shorten tree.] If the root node has only one child after the tree has been adjusted, make the child the new root.

CondenseTree(R, L)

Input: GiST R containing leaf node L.

Output: GiST with invariant properties maintained.

Sketch: If L has fewer than k*M elements, either eliminate L and relocate its entries, or borrow entries from elsewhere to put on L. Propagate node elimination upwards as necessary. Adjust all predicates on the path to the root, making them more specific as appropriate.

CT1: [Initialize] Set N=L. Set Q, the set of eliminated nodes, to be empty.

CT2: If N is the root, go to CT6. Otherwise let P=Parent(N), and let E.N be the entry on P that points to N.

CT3: [Handle under-full node.] If N has fewer than k*M entries:

CT3.1: [assuming not IsOrdered] Add the elements of N to set Q, delete E.N from P, and invoke AdjustKeys(R, P).

CT4: [Adjust covering predicate] If E.N was not deleted from P, then AdjustKeys(R, N);

CT5: [Propagate deletes] If E.N was deleted from P, let N=P, and go to CT2.

CT6: [Re-insert orphaned entries] If Q is not empty, invoke Insert(R, E, level(E)) for all elements E of Q.

Algorithm PickSplit(P)

Input: Given a set P of M+1 entries (p, ptr)

Output: Two sets of entries P1 and P2, each of size at least k*M.

Sketch: Given a collection of vectors x.i, we want to devise a procedure to split it into two parts.

What is claimed is:
1. A computer implemented method for transforming unstructured text input and determining a split value for indexed storage, the method comprising:
   (a) inputting a collection of n vectors x.i (i=1, . . . , n) representing said unstructured text input;
   (b) computing a mean x.avg=(1/n)* sum(i, x.i);
   (c) if x.avg is non-zero then;
      (c1) computing for each i a deviation value d.i=<x.i x.avg, x.avg>;
   (d) if x.avg is zero then;
      (d1) picking a specific x.i that is not zero and denoting it x.pvg;
      (d2) computing for each i a deviation value d.i=<x.i x.pvg, x.pvg>;
   (e) initializing D to a collection of said n deviation values d.i; and
   (f) if D contains more than two deviation values and if a smallest deviation value and a largest deviation value of D are different then:
      (f1) removing said smallest deviation value and said largest deviation value from said collection D;
      (f2) repeating (f)-(f1);
   (g) if D contains one deviation value then:
      (g1) outputting said D one deviation value as said split value to said computer for said indexed storage of said unstructured text input and presentation to a user;

(h) if D contains two deviation values then:
  (h1) computing an average of said two deviation values;
  (h2) outputting said average of said two deviation values as said split value to said computer for said indexed storage of said unstructured text input and presentation to a user.

2. The method of claim 1 wherein said x.i has no duplicates.

3. The method of claim 1 further comprising:
(d3) inputting a value p percent, where p is greater than zero (p>0), from a 50% split that is allowable;
  (d3a) for z=1 to n
    (d3a1) calculating an overall percentage Plez for all said n deviation values d.i that are less than or equal to d.z;
    (d3a2) If (50%-p) <Plez <(50%+p) then:
      (d3a2a) keeping said picked x.pvg;
      (d3a2b) going to (e);
  (d3b) next z;
  (d3c) discarding said picked x.pvg value; and
  (d3d) going to (d).

4. The method of claim 1 further comprising:
computing for any arbitrary vector y a value d=<y x.avg, x.avg>; and
if d >0 then:
  assigning said vector y to an "upper" group;
else:
  assigning said vector y to a "lower" group.

5. A computer readable storage medium having stored thereon instructions, which when executed performs:
(a) inputting a collection of n vectors x.i (i=1, . . . , n);
(b) computing a mean x.avg=(1/n)*sum(i, x.i);
(c) if x.avg is non-zero then;
  (c1) computing for each i a deviation value d.i=<x.i x.avg, x.avg>;
(d) if x.avg is zero then;
  (d1) picking a specific x.i that is not zero and denoting it x.pvg;
  (d2) computing for each i a deviation value d.i=<x.i x.pvg, x.pvg>;
(e) initializing D to a collection of said n deviation values d.i; and
(f) if D contains more than two deviation values and if a smallest deviation value and a largest deviation value of D are different then:
  (f1) removing said smallest deviation value and said largest deviation value from said collection D;
  (f2) repeating (f)-(f1);
(g) if D contains one deviation value then:
  (g1) outputting said D one deviation value as a split value;
(h) if D contains two deviation values then:
  (h1) computing an average of said two deviation values;
  (h2) outputting said average of said two deviation values as a split value.

6. A system comprising a processor coupled to a memory, which when executing a set of instructions performs:
(a) inputting a collection of n vectors x.i (i=i , . . . , n);
(b) computing a mean x.avg=(1/n)* sum(i, x.i);
(c) if x.avg is non-zero then;
  (c1) computing for each i a deviation value d.i=<x.i x.avg, x.avg>;
(d) if x.avg is zero then;
  (d1) picking a specific x.i that is not zero and denoting it x.pvg;
  (d2) computing for each i a deviation value d.i=<x.i x.pvg, x.pvg>;
(e) initializing D to a collection of said n deviation values d.i; and
(f) if D contains more than two deviation values and if a smallest deviation value and a largest deviation value of D are different then:
  (f1) removing said smallest deviation value and said largest deviation value from said collection D;
  (f2) repeating (f)-(f1);
(g) if D contains one deviation value then:
  (g1) outputting said D one deviation value as a split value;
(h) if D contains two deviation values then:
  (h1) computing an average of said two deviation values;
  (h2) outputting said average of said two deviation values as a split value.

* * * * *

UNITED STATES PATENT AND TRADEMARK OFFICE
CERTIFICATE OF CORRECTION

PATENT NO.        : 7,650,320 B2                                              Page 1 of 1
APPLICATION NO.   : 11/361166
DATED             : January 19, 2010
INVENTOR(S)       : Russell Toshio Nakano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twenty-third Day of November, 2010

David J. Kappos
*Director of the United States Patent and Trademark Office*